United States Patent Office 3,584,078
Patented June 8, 1971

3,584,078
POLYVINYL ESTERS AND DERIVATIVES THEREFROM
Louis A. Pilato, Bound Brook, and Eric R. Wagner, Basking Ridge, N.J., assignors to Union Carbide Corporation
No Drawing. Original application July 11, 1966, Ser. No. 564,048, now Patent No. 3,519,701. Divided and this application Mar. 16, 1970, Ser. No. 20,145
Int. Cl. C08f 29/32, 45/28
U.S. Cl. 260—878
3 Claims

ABSTRACT OF THE DISCLOSURE

Non-aqueous dispersions of polyvinyl acetals have been prepared directly from non-aqueous dispersions of polyvinyl acetate by contacting the latter with trioxane or n-butyraldehyde in the presence of a catalytic amount of hydrochloric acid.

---

This is a division of Ser. No. 564,048 filed July 11, 1966, now U.S. Pat. No. 3,519,701.

This invention relates to polyvinyl esters and derivatives therefrom and more particularly to the preparation of polyvinyl alcohols and polyvinyl acetals from non-aqueous dispersions of polymerized vinyl esters.

It is known that polyvinyl alcohols can be prepared by the alcoholysis or ester interchange of polymerized vinyl esters. Commercially polyvinyl alcohols are commonly produced by the alcoholysis of alcohol solutions of polyvinyl acetate using either a base or acid alcoholysis catalyst. As the alcoholysis proceeds the polyvinyl alcohol formed precipitates when a base catalyst is used for the alcoholysis. Once the alcoholysis reaction begins it proceeds quite rapidly, resulting in a slurry of polyvinyl alcohol insoluble in the alcohol solvent. Since the base catalyzed alcoholysis of polymerized vinyl esters proceeds rapidly, the commercially available polyvinyl alcohols usually are in the range of about 76 to 99 percent hydrolyzed.

It is an object of this invention to provide methods for the preparation of polyvinyl alcohols by the alcoholysis of polymerized vinyl esters in a controlled manner such that the resultant polyvinyl alcohols can have a degree of alcoholysis or hydrolysis in the range of about 1 percent to about 99 percent.

It is still another object to provide polyvinyl alcohols having enhanced non-blocking characteristics.

These and other objects have been attained by a method which comprises contacting a non-aqueous dispersion of polymerized vinyl ester, having up to 20 carbon atoms per vinyl ester monomer unit, dispersed in an inert hydrocarbon diluent by means of a polymeric organic interfacial agent, said polymerized vinyl ester having an average particle size of about 0.05 to 50 microns, with about 0.01 to 10.0 moles, per mole of said polymerized vinyl ester, of an aliphatic alcohol having from 1 to about 6 carbon atoms and about 0.001 to 0.10 mole, per mole of said polymerized vinyl ester, of an alcoholysis catalyst for at least 5 minutes at a temperature of about 15° to about 100° C., and recovering said polyvinyl alcohol.

It is another object to provide polyvinyl ester particles integrally coated with an organic interfacial agent.

It is still another object to provide methods for the preparation of polyvinyl acetals from non-aqueous dispersions of polymerized vinyl esters.

The preferred polymerized vinyl ester used in this invention is polyvinyl acetate although other esters such as polyvinyl formate, polyvinyl propionate, polyvinyl butyrate and the like having up to 20 carbon atoms can be used if desired.

It is preferred to employ as the non-aqueous dispersion of polymerized vinyl ester one which has been obtained by the dispersion polymerization of vinyl ester monomer although polymerized vinyl esters made by other methods such as bead, emulsion or solution polymerization can also be used and then converted to a non-aqueous dispersion with a polymeric organic interfacial agent if desired.

Although the average particle size of the polymerized vinyl ester used in the dispersions of this invention can range from about 0.05 to 50 microns it is preferred to use particles in the range of about 0.1–5 microns and it is particularly preferred to use particle sizes in the range of about 0.1–1 micron.

The preferred inert organic diluents are aliphatic or cycloaliphatic hydrocarbons having from about 5 to 12 carbon atoms therein with pentane, isopentane, hexane, heptane, and isooctane being preferred aliphatic hydrocarbons and cyclopentane, cyclohexane, and methylcyclohexane being preferred cycloaliphatic hydrocarbons, as well as mixtures of the above.

Although aromatic hydrocarbons, ethers, esters, and other polar group containing diluents inert towards free radical initiators cannot be used in this invention alone, they may be if mixed with aliphatic or cycloaliphatic hydrocarbons such as those enumerated above.

Stated another way, the inert organic diluent or diluent mixture employed must be a solvent for the vinyl ester monomer used but a non-solvent for the polymerized vinyl ester used.

The polymeric organic interfacial agent used in the present invention must be one which has a backbone that is soluble in the inert hydrocarbon diluent and which has a site for grafting or anchoring to the polymerized vinyl ester used. The preferred interfacial agents include copolymers and graft copolymers of alpha olefins and vinyl esters, alpha olefins with other polar group containing vinyl monomers, polyvinylalkyl ethers, propylene oxide rubbers, butadiene-styrene rubbers, ethylene-propylene terpolymers, and the like.

It is particularly preferred to employ as the copolymer of an alpha olefin and a vinyl ester an ethylene/vinyl acetate copolpmer or vinyl acetate graft polymerized onto an ethylene/vinyl acetate copolymer. These ethylene-vinyl acetate copolymers and graft copolymers preferably contain from about 5 to 80 percent vinyl acetate copolymerized therein with 28 to 50 percent vinyl acetate being particularly preferred.

The preferred alkyl vinyl ether polymer is polyvinyl ethyl ether, although others such as polyvinyl isobutyl ether, polyvinyl propyl ether and the like can also be used.

The preferred oxide rubber polymer is polypropylene oxide rubber.

The concentration of interfacial agent should be at least 0.1 percent based on the weight of the dispersed polymer. It is preferred to use at least 0.2 percent, up to about 10 percent and if desired, even higher concentrations can be used.

Although temperatures of about 15 to about 100° C. can be used for the alcoholysis of the polymerized ester to polyvinyl alcohol, it is preferred to employ a temperature range of about 20° C. to about 50° C.

The minimum alcoholysis time has been given above as about 5 minutes. There is no maximum time since no further reaction occurs once essentially complete alcoholysis has taken place. The actual time used in any one run will depend upon the degree of alcoholysis desired.

The preferred alcoholysis catalysts are basic or acidic alcoholysis catalysts.

It is particularly preferred to use as the alcoholysis catalyst a basic alcoholysis catalyst of an alkali metal although other agents such as guanidine carbonate, sodium methyl carbonate, organic amines and the like can also be used. The preferred basic catalysts are hydroxides of alkali metals such as sodium hydroxide, potassium hydroxide, and lithium hydroxide and alkoxides of alkali metals such as sodium methoxide, potassium methoxide, sodium ethoxide, and the like.

Acidic alcoholysis catalysts which can be used include sulfuric acid, hydrogen chloride, sulfonic and phosphonic acids, sulfur dioxide and the like.

In addition other miscellaneous alcoholysis catalysts which can be used include alkyl orthotitanates such as tetraethyl orthotitanate, tetrabutyl orthotitanate and the like as well as derivatives thereof such as sodium hydrogen titanate, organic silicates, titanium tetrahalides and the like.

Polyvinyl alcohols made by the dispersion techniques disclosed herein have many advantages over polyvinyl alcohols made by the prior art methods, considered alone or in combination. Thus, for example, the polyvinyl alcohols of this invention are easily isolated from the reaction media by such methods as filtration, spray drying, centrifugation, and the like. Since these are prepared in dispersion there is no increase in viscosity during the alcoholysis step and the product may be obtained in high oslids content of approximately 60 to 80 percent. This invention also provides a means of obtaining a wide variety of polyvinyl alcohols of varying degrees of alcholysis or hydrolysis, that is, to say, products having degrees of hydrolysis of about 1 to 99%.

The polyvinyl alcohols of this invention are obtained with excellent color characteristics free from undesirable color bodies without the necessity for adding other color preventing agents.

The polyvinyl alcohols of this invention may be used as adhesives, paper coatings, molded or extruded articles and films, for textile warp sizing and other treatments, as emulsifiers, thickeners, release agents and the like.

The polyvinyl alcohols having degrees of hydrolysis in the range of 1 to 70%, due to their water insolubility, can be used as water swellable adhesives, anti-static agents, self-supporting films, shrinkable films for food packaging, crosslinking agents for fiber-bonding, foaming agents, wood-finishing sealants, chelating agents, crosslinking wire coatings and textile and paper finishes, printing inks and the like.

While not imperative for the practice of this invention, it is preferred that the non-aqueous dispersions of the polymerized vinyl esters used to prepare the polyvinyl alcohols of this invention, be prepared by a non-aqueous dispersion polymerization of the vinyl ester monomer used. The inert organic hydrocarbon diluent and interfacial agents given above as well as the concentrations given may be used for the non-aqueous dispersion polymerization of vinyl ester monomers. The dispersion polymerization polyvinyl ester particles obtained in this invention are unique in that they contain an outer coating of polymer organic interfacial agent attached to the polyvinyl ester particle. This is believed to result from the graft polymerization of the vinyl ester to the backbone of the interfacial agent as the vinyl ester homopolymerizes. Thus, for example, the dispersion polymerization of vinyl acetate using ethylene/vinyl acetate copolymer as interfacial agent affords polyvinyl acetate particles with an outer coating of ethylene/vinyl acetate grafted thereto.

Any free radical polymerization initiator known in the art may be used including organic peroxides such as, benzoyl peroxide, lauroyl peroxide, caproyl peroxide, diacetyl peroxide; azo catalysts such as, azo-bisisobutyronitrile; and dialkylperoxy dicarbonates, such as diisopropylperoxy dicarbonate as well as redox initiators and the like. Although initiator concentrations in the range of about 0.01 to 1 percent, based on the weight of vinyl ester, can be used, about 0.06 to 0.2 is preferred.

Polymerization temperatures of about 0 to 150° C. may be used although a range of about 25 to 125° C. is preferred and a temperature of about 50 to 100° C. is particularly preferred.

The dispersion polymerization of vinyl esters having from 3 to 20 carbon atoms inclusive is achieved by a method which comprises:

(a) Heating for at least 5 minutes with agitation at a temperature of about 0 to 150° C.;

(1) a mixture of vinyl ester and an inert organic diluent, said vinyl ester being present in a concentrtaion of about 5 to 85 percent by weight,
(2) about 0.1 to 10 percent, based on the weight of said vinyl ester, of a polymeric organic interfacial agent, and
(3) about 0.01 to 1 percent, based on the weight of said vinyl ester, of a free radical polymerization initiator; and (b) Recovering normally solid dispersion polymerized vinyl ester having a particle size of about 0.05 to 50 microns and an outer coating of polymeric organic interfacial agent.

Where polyvinyl esters other than those prepared by the non-aqueous dispersion technique are to be used they must be reduced in average particle size to a range of about 0.05 to 50 microns and then dispersed in the aforementioned diluents using one of the aforementioned interfacial agents to stabilize the dispersion.

Polyvinyl acetals can be produced directly from the dispersions of polymerized vinyl esters described above by heating these dispersions admixed with an aldehyde or aldehyde precursor, an aliphatic alcohol and an acid catalyst. Acetals can also be produced from the dispersions of polyvinyl alcohols described above admixed with an aldehyde, an aliphatic alcohol and an acid catalyst.

It is preferred to synthesize polyvinyl acetals directly from non-aqueous dispersions of polymerized vinyl esters by a process which comprises:

(a) Contacting a non-aqueous dispersion of polymerized vinyl ester, having up to 20 carbon atoms per vinyl ester monomer unit, dispersed in an inert hydrocarbon diluent by means of a polymeric organic interfacial agent, said polymerized vinyl ester having an average particle size of about 0.05 to 50 microns, with:

(1) about 0.05 to 3.00 moles per mole of polymerized vinyl ester, of an aliphatic alcohol having from 1 to about 6 carbon atoms,
(2) about 0.03 to 1.5 moles, per mole of polymerized vinyl ester, of an aliphatic aldehyde having from 1 to about 6 carbon atoms, and
(3) a catalytic amount of an acid catalyst, for at least 5 minutes at a temperature of about 15° C. to 70° C.; and (b) Recovering said polyvinyl acetal as a solid or as a 5–60% by weight solids dispersion in an inert hydrocarbon diluent.

The preferred alcohols are methanol, ethanol and butanol. The preferred aldehydes are formaldehyde, acetaldehyde and butyraldehyde. The preferred acid catalysts are mineral acids of which hydrochloric, sulfuric, phosphoric and perchloric acids are particularly preferred although organic acids such as acetic, aryl sulfonic acids and the like can also be used if desired.

The concentration of acid used is literally catalytic that is from about 0.001 to 1.0 percent based on the weight of polyvinyl ester charged.

No special equipment is required for the alcoholysis of polymerized vinyl esters to polyvinyl alcohols using the dispersion technique of this invention. Stirred reactors capable of being heated or cooled are well known in the polymerization art are satisfactory. The same equipment is also satisfactory for the polymerization of the vinyl esters in dispersion if it is desired to use such for the preparation of the polyvinyl alcohols of this invention and also for the preparation of polyvinyl acetals from either non-aqueous dispersions of polymerized vinyl esters or polyvinyl alcohols.

Pressure is not at all critical for any of the processes of this invention so that while atmospheric pressures are preferred for economic reasons, subatmospheric or superatmospheric pressures can also be used if desired.

The polyvinyl alcohols prepared in this invention consist essentially of adsorbed interfacial agent surrounding each polyvinyl alcohol particle. While this adsorbed layer of interfacial agent does not in anyway adversely affect the desirable properties and end uses of the polyvinyl alcohol so prepared it gives the added advantages in providing a polyvinyl alcohol in a particulate form which does not result in blocking on storage. Another advantage of this type of polyvinyl alcohol particle is that it possesses less water sensitivity than presently commercially available polyvinyl alcohols.

The invention is further described by the examples which follow in which all parts and percentages are by weight unless otherwise specified.

EXAMPLES 1-5

Non-aqueous dispersion polymerization of vinyl acetate

In a 4-neck 1-liter resin kettle equipped with a stirrer, reflux condenser, thermometer and a nitrogen gas inlet, 240 grams (60% by weight) of vinyl acetate, 160 grams (40% by weight of cyclohexane (Phillips polymerization grade)) and 1.4007 grams (0.6% by weight based on vinyl acetate) of ethylene-vinyl acetate copolymer containing 28% vinyl acetate polymerized therein and having a melt index of 23.8 dg./min. (a commercial product sold by Union Carbide Corporation as DQDA 3269) were added. An oil bath was used to heat the kettle to 70° C. (The higher temperature is required to dissolve the ethylene/vinyl acetate copolymer.) After the interfacial agent was dissolved, about one hour, 0.1514 gram (0.0631% by weight based on vinyl acetate) of benzoyl peroxide was added. Within an hour a slight haze was observed, and after 1.5 hours a milky dispersion developed. Polymerization was allowed to proceed overnight for a total of 22 hours. The solids level of the dispersion was 58% (97% conversion). The dispersion was completely fluid with this high solids level. The inherent viscosity ($\eta_{inh}$) was 0.45 (0.2% solution in cyclohexanone at 30° C.). The particle size of the dispersion was 0.3–5µ. Four additional runs were made at various reaction temperatures, reaction times and catalyst concentration. Pertinent data are found in Table I.

into a coarse dispersion of hydrolyzed material. After three hours a sample of coarse dispersion was removed, dried and determined to be 75% hydrolyzed (see below). The remaining portion was neutralized with 1.5 ml. of glacial acetic acid and then placed into a container. Some fine material remained suspended within the supernatant liquid (methyl acetate-methanol-cyclohexane).

Determination of inherent viscosity

A sample of dry polyvinyl acetate weighing about 0.20 gram was placed in a 100 ml. volumetric flask and diluted to the mark with cyclohexane. The solution was kept in a 30° C. constant temperature bath for a period of two hours prior to viscosity determination. A Cannon-Fenske viscometer ASTM, size 50 was used for the viscosity determination. An average of 5 readings yielded a value of 247.8 seconds. A blank value of 225.8 seconds was determined initially for the solvent alone. The formula for the determination of inherent viscosity is:

$$\eta_{inh} = \frac{\ln t_s/t_o}{C}$$

$t_s$=flow time of sample
$t_o$=flow time of reference solvent
$C$=concentration of polymer solution in grams/100 ml. of solution Determination of degree or percent of hydrolysis A two gram dry sample of partially hydrolyzed product was placed into a 500 ml. Erlenmeyer flask with a ground glass standard taper 24/40 opening. About 5 ml. of methanol was added to the dry sample which dispersed the resin and then 50 ml. of water was added. To the resulting heterogeneous mixture, 50 ml. of approximately 0.5 N KOH in methanol was added with a buret. The basic mixture was heated under reflux for one hour, cooled and titrated with standard 0.5 N HCl to a phenolphthalein end point. A blank was prepared and determined simultaneously. The titer, or difference in the volume of acid required for the blank less the sample yielded the weight percent of polyvinyl acetate by proper substitution in the formula:

$$\text{Percent acetate} = \frac{(V)(N)(8.6)}{\text{weight of sample}}$$

V=volume of titer in milliliters
N=normality of standard acid

TABLE I.—INFLUENCE OF REACTION VARIABLES ON MOLECULAR WEIGHT OF POLYVINYL ACETATE

| Example | Temp., °C. | Time (hours) | Diluent | Percent Catalyst[1] | Percent Solids | $\eta_{inh}$ |
|---|---|---|---|---|---|---|
| 1 | 70 | 22 | Cyclohexane | 0.0631 | 58 | 0.48 |
| 2 | 70 | 5.5 | do | 0.125 | 54 | 0.45 |
| 3 | 70 | 20 | do | 0.125 | 60 | 0.44 |
| 4 | 75 | 10 | do | 0.125 | 60 | 0.44 |
| 5 | 80 | 6 | do | 0.125 | 60 | 0.30 |

[1] Benzoyl peroxide, concentration based on weight of monomer.

EXAMPLE 6

Hydrolysis of non-aqueous dispersion polyvinyl acetate

The dispersion of polyvinyl acetate prepared in Example 1 was hydrolyzed in the same equipment in the following manner. Methanol 100 ml., 79.6 grams (2.5 moles) was added slowly to the opaque mixture of polyvinyl acetate, 240 grams (2.8 moles). Removal of a small amount of resin indicated that a dispersion was still present and not a solution of polymer. A solution of 2.4 grams (0.445 mole) of sodium methoxide in 15 ml. methanol, 11.9 grams (0.37 mole), was added slowly to the methanol-cyclohexane dispersion of polyvinyl acetate. The initial dispersion was at 26° C., and upon addition of the base catalyst the temperature rose rapidly to 30° C. Within twenty minutes the smooth fine dispersion was transformed The weight percent polyvinyl acetate was then transformed into mole percent which is the reported extent of hydrolysis.

EXAMPLES 7-12

Using the equipment and procedure described in Example 1 the following charge was used:

| | Grams |
|---|---|
| Vinyl acetate | 600 |
| n-Heptane | 400 |
| Ethylene-vinyl acetate copolymer (28% vinyl acetate) | 3.6102 |
| Benzoyl peroxide | 0.7519 |

The polymerization proceeded in a manner similar to Example 1. The initial haze in the diluent appeared in 5–15 minutes with heptane as the diluent rather than in one hour as was the case with cyclohexane as the diluent.

After 11 hours at 71° C. a polyvinyl acetate dispersion was obtained containing 51% solids (theoretical amount 60%). When dried the polyvinyl acetate produced had an inherent viscosity of 0.75 when measured as described previously.

The influence of such reaction variables as temperature, reaction time, and catalyst concentration was demonstrated with five additional vinyl acetate polymerizations in n-heptane all run at a 60/40 monomer/diluent ratio. Pertinent data are presented in Table II.

TABLE II.—INFLUENCE OF REACTION VARIABLES ON MOLECULAR WEIGHT OF POLYVINYL ACETATE

| Example | Temp., °C. | Time (hours) | Diluent | Percent Catalyst[1] | Percent Solids | $\eta_{ihn}$ |
|---|---|---|---|---|---|---|
| 7 | 65 | 12 | Heptane | 0.125 | 49 | 0.84 |
| 8 | 71 | 11 | do | 0.125 | 51 | 0.75 |
| 9 | 72 | 12 | do | 0.125 | 52 | 0.76 |
| 10 | 70 | 20 | do | 0.25 | 53 | 0.65 |
| 11 | 75 | 6.5 | do | 0.125 | 58 | 0.75 |
| 12 | 80 | 3 | do | 0.125 | 48 | 0.61 |

[1] Benzoyl peroxide, concentration based on weight of monomer.

EXAMPLE 13

The utility of other peroxide catalysts was demonstrated by using 0.493 gram of lauroyl peroxide instead of benzoyl peroxide in the equipment and procedure described in Examples 1–5. A comparable polyvinyl acetate dispersion was obtained.

EXAMPLE 14

In a Parr bomb having a void of 1200 cc. was placed 2.1006 grams of ethylene-vinyl acetate copolymer containing 28% vinyl acetate copolymerized therein and 320 grams of n-pentane. Vinyl acetate (430 grams) was next charged to the bomb which was sealed and flushed free of air with nitrogen. The bomb was heated to approximately 80° C., pressured with nitrogen to 75 p.s.i.g. and maintained at this temperature for about one hour. Then 0.6008 gram of benzoyl peroxide dissolved in 50 grams of vinyl acetate was added to the bomb under pressure. An exotherm was observed after 30–40 minutes and the run was allowed to continue for 8 hours. After cooling the bomb, it was opened and the polyvinyl acetate dispersion product removed having an average particle size of 8–10 microns, and an inherent viscosity of 0.66.

EXAMPLE 15

Example 14 was repeated except for the use of cyclohexane as diluent instead of n-pentane and a reaction time of three hours instead of eight. A 57% solids dispersion of polyvinyl acetate was obtained, the dried polyvinyl acetate having an inherent viscosity of 0.36 (cyclohexanone at 30° C.).

A series of experiments was run in which the ethylene-vinyl acetate copolymer interfacial agent was replaced by the following polymeric stabilizers in some cases with a change in diluent as well: propylene oxide rubber in n-heptane, polyvinyl ethyl ether, styrene-butadiene block copolymer, ethylene-propylene rubber, ethylene-vinyl acetate copolymer containing 12% vinyl acetate copolymerized therein, ethylene-acrylic acid copolymers containing 2.3% and 5% acrylic acid copolymerized therein respectively, ethylene-N-methyl-N-vinyl acetamide containing 26% N-methyl-N-vinyl acetamide copolymerized therein and ethylene-vinyl acetate graft copolymer. As in previous examples the weight ratio of monomer to diluent was 60:40.

Particulars are given in the examples which follow and summarized in Table III.

EXAMPLE 16

To a 4-neck 500-ml. resin kettle equipped with stirrer, condenser, and nitrogen purging tube were added 200 grams (2.32 moles) of vinyl acetate, 200 grams (2.00 moles) of n-heptane, and 1.25 grams of polypropylene oxide rubber (reduced viscosity 12.0 in benzene at 25° C.). The system was completely purged with nitrogen and maintained under positive nitrogen pressure during the entire reaction period. The contents were heated to 75–80° C. and 0.25 gram ($1.03 \times 10^{-3}$ moles) of benzoyl peroxide added. The reaction was allowed to proceed for a total of 22 hours. After this reaction period a stable dispersion of polyvinyl acetate in n-heptane was obtained which showed no evidence of agglomeration. The inherent viscosity of the polyvinyl acetate was 0.46.

EXAMPLE 17

Example 16 was repeated with the exception that 2.00 grams of propylene oxide rubber and 160 grams of heptane was used. The inherent viscosity of the dispersed polyvinyl acetate product was 0.75.

EXAMPLE 18

To a 4-neck 500-ml. resin kettle equipped with stirrer, condenser, and nitrogen purging tube were added 240 grams (2.79 moles) of vinyl acetate, 134 grams (1.34 moles) of n-heptane and 28 grams of a 5% solution of polyvinyl ethyl ether in n-heptane. The contents were heated to 75–80° C. and 0.3 gram ($1.24 \times 10^{-3}$ moles) of benzoyl peroxide added. The system was maintained under nitrogen pressure during the entire reaction period. The reaction was allowed to proceed for a total of 24 hours. The percent conversion was 99% at the end of this period. A stable dispersion in n-heptane was obtained with an average particle size of 3–6μ. The inherent viscosity of the polyvinyl acetate was 0.74.

EXAMPLE 19

To a 4-neck 500-ml. resin kettle equipped with stirrer, condenser, and nitrogen purging tube were added 1.4 grams of polyvinyl ethyl ether, having a reduced viscosity of 3+.5 in benzene (0.1 gram in 100 ml. of solution at 20° C.), 240 grams (2.79 moles) of vinyl acetate and then 160 grams (1.91 moles) of cyclohexane. The reaction contents were heated to 70° C. and 0.3 gram ($1.24 \times 10^{-3}$ moles) of benzoyl peroxide added. The reaction was allowed to proceed for 20 hours to afford quantitative conversion of vinyl acetate to dispersion polyvinyl acetate. The average particle size of the polymeric dispersion was approximately 9μ. The inherent viscosity of the polyvinyl acetate was 0.46.

EXAMPLE 20

To the dispersion of polyvinyl acetate obtained in Example 19 was added 100 grams (3.13 moles) of methanol dropwise over a 30 minute period. Then a solution of 1.56 grams (0.028 mole) potassium hydroxide dissolved in 13 grams (0.41 mole) of ethanol was added over a 15 minute period. The hydrolysis reaction time was 18 hours. A dispersion of polyvinyl alcohol was obtained. The level of hydrolysis was 80%.

EXAMPLE 21

To a 4-neck 500-ml. resin kettle equipped with stirrer, condenser and nitrogen purging tube were added 1.4 grams of polyvinyl ethyl ether, having a reduced viscosity of $3\pm.5$ in benzene at 20° C. (cf. Example 19), dissolved in 240 grams (2.79 moles) vinyl acetate and then 152 grams (1.52 moles) of n-heptane and 8 grams (0.091 mole) of ethyl acetate. The reaction contents were heated to 70° C. and 0.3 gram ($1.23 \times 10^{-3}$ moles) of benzoyl peroxide added. The reaction was allowed to proceed for 20 hours to afford a quantitative conversion of vinyl acetate to dispersion polyvinyl acetate. The inherent viscosity of the polyvinyl acetate was 0.70. The visual appearance of the dispersion indicated a finer particle size than in heptane alone.

EXAMPLE 22

Example 21 was repeated with the exception that 80 grams each of heptane and cyclohexane were used as the diluent. The dispersed polyvinyl acetate product had an inherent viscosity of 0.58.

EXAMPLE 23

The procedure described in Example 1 was repeated with the following charge and some modifications.

Vinyl acetate—240 grams (2.79 moles)
Methylcyclohexane—160 grams (1.67 moles)
Polyvinyl ethyl ether—1.4 grams
Benzoyl peroxide—0.3 gram ($1.24 \times 10^{-3}$ moles)

In this polymerization the polyvinyl ethyl ether was dissolved in the vinyl acetate and methylcyclohexane by heating gently with stirring. The benzoyl peroxide catalyst was then added and the reaction run for 21 hours to 100% conversion. A fine particle polyvinyl acetate dispersion was obtained with some particles having a size of $12\mu$.

The inherent viscosity of the polyvinyl acetate was 0.36.

EXAMPLE 24

The procedure of Example 1 was repeated with the following charge:

Vinyl acetate—221 grams (2.57 moles)
Heptane—141 grams (1.41 moles)
Thermoplastic 125—Styrene-butadiene block copolymer 25:75%) (5% solution in 1/1 vinyl acetate/heptane)—40 grams total
Benzoyl peroxide—0.3 gram ($1.24 \times 10^{-3}$ moles)

The total reaction time was 6 hours at about 70° C. The conversion to polyvinyl acetate was 82%. A fine dispersion of polyvinyl acetate was obtained. The inherent viscosity of the polyvinyl acetate produced was 0.62.

EXAMPLE 25

The procedure described in Example 1 was used with the following charge:

Vinyl acetate—240 grams (2.79 moles)
Heptane—150 grams (1.50 moles)
Ethylene-propylene cyclopentadiene terpolymer, 20% solution in benzene—10 grams total
Benzoyl peroxide—0.3 gram ($1.24 \times 10^{-3}$ moles)

The total reaction time at about 70° C. was 22 hours. The percent conversion was 96.5%. A fine particle size dispersion in heptane/benzene was obtained. The polyvinyl acetate inherent viscosity was 0.69.

EXAMPLE 26

Example 1 was repeated with the following exceptions: the ethylene-vinyl acetate copolymer contained 12% vinyl acetate, the diluent consisted of 153 grams of cyclohexane and 7 grams of benzene and the catalyst charge was 0.125 gram of benzoyl peroxide. The inherent viscosity of the polyvinyl acetate dispersion product was 0.45.

EXAMPLE 27

The procedure described in Example 1 was used with the following charge:

Vinyl acetate—240 grams (2.79 moles)
Cyclohexane—153 grams (1.82 moles)
Ethylene-acrylic acid copolymer [1]—1.4 grams
Benzene—(0.08 mole)
Benzoyl peroxide—($124 \times 10^{-3}$ moles)

[1] This copolymer interfacial agent contained 2.7% acrylic acid copolymerized therein and had a melt index of 4.2 dg./min.

The ethylene-acrylic acid copolymer was dissolved in the benzene at about 48° C. and the cyclohexane and vinyl acetate slowly added. Then at 70° C. the benzoyl peroxide was added. The polymerization was run for 22 hours to 100% conversion. The inherent viscosity of the polyvinyl acetate produced was 0.43.

EXAMPLE 28

Example 27 was repeated using as the interfacial agent an ethylene-acrylic acid copolymer containing 5% acrylic acid copolymerized therein and having a melt index of 2.2 dg./min. A polyvinyl acetate comparable to that in Example 27 was obtained.

EXAMPLE 29

Example 1 was repeated with the exception that ethylene-N-methyl-N-vinyl acetamide copolymer containing 26% of N-methyl-N-vinyl acetamide copolymerized therein and having a melt index of 32 dg./min. was substituted for the graft copolymer and 0.3 gram of benzoyl peroxide were used. The polyvinyl acetate dispersion product inherent viscosity was 0.45.

EXAMPLE 30

The procedure described in Example 1 was used with the following charge substituting azobisisobutyronitrile for benzoyl peroxide as the free radical initiator:

Vinyl acetate—240 grams (2.79 moles)
Cyclohexane—160 grams (1.91 moles)
Grafted ethylene-vinyl acetate copolymer [1]—1.4 grams
Azobisisobutyronitrile—0.15 gram

[1] 36% vinyl acetate grafted to an ethylene-vinyl acetate copolymer containing 28% vinyl acetate copolymerized therein.

The ethylene vinyl acetate graft copolymer was dissolved in the cyclohexane and vinyl acetate at 70° C. and then azobisisobutyronitrile initiator added. Polymerization was carried out for 21 hours. A quantitative conversion to polyvinyl acetate was obtained with a few aggregate particles. The inherent viscosity of the polyvinyl acetate obtained was 0.44.

TABLE III

| Example | Interfacial agent | Diluent | Catalyst, percent [1] | $\eta_{inh}$ | Time (hours) | Temp., °C. |
|---|---|---|---|---|---|---|
| 16 | Polypropylene oxide rubber, 1.25 grams | Heptane, 200 grams | 0.125 | 0.46 | 22 | 75–80 |
| 17 | Polypropylene oxide rubber, 2.00 grams | Heptane, 160 grams | 0.125 | 0.75 | 12 | 77–86 |
| 18 | Polyvinyl ethyl ether, 1.40 grams | do | 0.125 | 0.74 | 24 | 75–80 |
| 19 | do | Cyclohexane, 160 grams | 0.125 | 0.46 | 20 | 70 |
| 21 | do | 95:5 (heptane/ethyl acetate), 152/8 grams. | 0.125 | 0.70 | 22 | 70 |
| 22 | do | 50:50 (heptane/cyclohexane), 80/80 grams. | 0.125 | 0.58 | 21 | 70–75 |
| 23 | do | Methylcyclohexane, 160 grams | 0.125 | 0.36 | 21 | 74–82 |
| 24 | Styrene-butadiene block copolymer, 2.00 grams | Heptane, 160 grams | 0.125 | 0.62 | 6 | 67–81 |
| 25 | Ethylene-propylene rubber cyclopentadiene, 2.00 grams | 95:5 (heptane/benzene), 150/8 grams | 0.125 | 0.69 | 22 | 67–81 |
| 26 | Ethylene-vinyl acetate (12% vinyl acetate), 1.4 grams | 96:4 (cyclohexane/benzene), 153/7 grams. | 0.125 | 0.45 | 23 | 67–72 |
| 27 | Ethylene acrylic acid copolymer (2.7% acrylic acid), 1.40 grams. | do | 0.125 | 0.43 | 22 | 69–74 |
| 28 | Ethylene acrylic acid copolymer (5% acrylic acid), 1.40 grams. | do | 0.125 | 0.40 | 22 | 66–73 |
| 29 | Ethylene N-methyl, N-vinyl acetamide (26% vinyl acetamide), 1.40 grams. | Cyclohexane, 160 grams | 0.125 | 0.45 | 21 | 67–72 |
| 30 | Grafted ethylene vinyl acetate, 1.40 grams | do | [2] 0.0625 | 0.44 | 21 | 67–73 |

[1] Benzoyl peroxide, concentration based on weight of monomer.  [2] Azo-bis-isobutyronitrile.

In order to demonstrate the feasibility of preparing polyvinyl alcohol with controlled percents of hydrolysis in the same reactor used for preparing polyvinyl acetate by a dispersion polymerization technique, the following examples were carried out using 1 mole percent of catalyst i.e., either sodium hydroxide or sodium methoxide and 0.25 to 1 equivalent of methanol.

EXAMPLES 31–38

The general procedure described in Examples 1–5 was used with a charge consisting of 320 grams of cyclohexane, 480 grams of vinyl acetate, 2.7216 grams of ethylene/vinyl acetate copolymer stabilizer (28% vinyl acetate) and 0.6206 gram of benzoyl peroxide. After 18 hours polymerization at 70° C. a 60% solids dispersion of polyvinyl acetate was obtained having an inherent viscosity of 0.44.

The kettle was cooled to a temperature of 25° C. and 94 ml. of methanol was added to the dispersion product with stirring. Then 15 ml. of methanol containing 1.12 grams of sodium hydroxide was added from a dropping funnel followed by a 4 ml. funnel wash of methanol.

Hydrolysis of the polyvinyl acetate dispersion was allowed to proceed for 3 hours. The polyvinyl alcohol product remained as a dispersion which could be maintained as such or dried to afford solid polyvinyl alcohol. The percent hydrolysis of the product was 42%.

Similar examples were performed under varied temperatures and times and with varied equivalents of methanol. As shown in Table IV polyvinyl alcohol products were obtained ranging in percent hydrolysis for 26 to 78%.

TABLE IV.—BASIC HYDROLYSIS OF NON-AQUEOUS DISPERSION POLYVINYL ALCOHOL

| Example | Temp., °C. | Time (hours) | Equivalent of MeOH | Percent hydrolysis |
|---|---|---|---|---|
| 32 | 25 | 2.0 | 0.25 | 26 |
| 33 | 25 | 2.5 | 0.25 | 28 |
| 34 | 25 | 4.0 | 1 | 71 |
| 35 | 25 | 5.0 | 1 | 73 |
| 36 | 25 | 5.5 | 1 | 77 |
| 37 | 60 | 2.0 | 1 | 77 |
| 38 | 60 | 2.0 | 1 | 78 |

EXAMPLES 39 AND 40

The general procedure described in Examples 1–5 was used with a charge consisting of 320 grams of cyclohexane, 480 grams of vinyl acetate, 2.5690 grams of ethylene-vinyl acetate copolymer (28% vinyl acetate) and 0.6000 gram of benzoyl peroxide to provide a 61% solids dispersion of polyvinyl acetate. After cooling to a temperature of 25° C. 200 ml. of methanol was added to the kettle and after 15 minutes of continued stirring 3.02 grams of sodium methoxide dissolved in 75 ml. of methanol was added to the dispersion. After a hydrolysis period of 5 hours the resultant polyvinyl alcohol produced in dispersion was found to be 85% hydrolyzed.

When Example 39 was repeated at a hydrolysis temperature of 30° C. rather than 25° C. and for a hydrolysis period of 3 rather than 5 hours the resultant polyvinyl alcohol was found to be 75% hydrolyzed.

EXAMPLE 41

A Paar bomb having a void of 1200 cc. was charged with 430 grams of vinyl acetate, 320 grams of cyclohexane, and 2.9 grams of ethylene-vinyl acetate copolymer (28% vinyl acetate). The charge was allowed to come to a temperature of 80° C. and 0.6006 gram of benzoyl peroxide dissolved in 50 grams of vinyl acetate was added to the bomb under a pressure of 25 p.s.i. (nitrogen). The charge was polymerized in the bomb for 14 hours at 80° C., after which time the product, a 61% solids dispersion of polyvinyl acetate having an inherent viscosity of 0.395 (cyclohexanone at 30° C.), was adjusted to a temperature of 60° C. and 170 ml. of methanol added to the bomb followed by a solution of 2.31 grams of sodium hydroxide dissolved in 56 ml. of methanol. Hydrolysis was allowed to proceed for 4.5 hours at 60° C. After removal of the polyvinyl alcohol dispersion product from the bomb, the percent hydrolysis was determined to be 87%.

EXAMPLE 42

To a 5-gallon turbine agitated still 7.7 kg. (90 moles) of vinyl acetate, 5.3 kg. (63 moles) of cyclohexane and 47.7 grams of ethylene-vinyl acetate copolymer (28% vinyl acetate) were charged. The system was purged with nitrogen and slight nitrogen pressure maintained on the vessel throughout the polymerization. After mixing for one hour at 80° C., 9.9 grams (0.041 mole) of benzoyl peroxide was charged in 220 grams (2.56 moles) of vinyl acetate. The charge was allowed to react for 6 hours at 80° C., after which the pressure was lowered to 5″ of vacuum, and approximately 1.5 gallons of liquid stripped off. The temperature was lowered to 50° C. and 48.4 grams (0.90 mole) of sodium methoxide in 3.6 liters (2880 grams; 90 moles) of methanol were added to the reaction. After a 5 hour hydrolysis reaction time 52 ml. (54.6 grams; 0.91 mole) of glacial acetic acid and 1.5 liters of methanol were added to the reaction mixture. An acetate determination showed that the product was 84% (mole percent) hydrolyzed. The product was stirred for 0.5 hours and then transferred to a container. Later the dispersion was centrifuged and the product dried to constant weight. A fine particulate powder was obtained amounting to a polyvinyl alcohol yield of 13.7 lbs. (6.2 kg.).

EXAMPLE 43

The procedure was the same as that of Example 42 with the following exceptions. The initial polymerization temperature was 82° C. instead of 80° C. The pressure was dropped to 13″ of vacuum for the strip-off. The temperature of hydrolysis was 35° C. The hydrolysis reaction time was 3 hours. A polyvinyl alcohol product of 72% hydrolyzed polyvinyl acetate was obtained in a yield of 11.4 lbs. (5.2 kg.).

EXAMPLE 44

The procedure was the same as that of Example 42 with these exceptions. The initial reaction temperature was 85° C. The pressure was dropped to 13″ vacuum for strip-off. The amount of methanol for hydrolysis was 7.2 liters (5760 grams; 180 moles). The hydrolysis reaction time was 6 hours. The quantity of cyclohexane (in place of methanol) used with the glacial acetic acid was 500 ml. The level of hydrolysis obtained was 98.5%. The polyvinyl alcohol yield was 9.0 lbs. (4.1 kg.).

EXAMPLE 45

The procedure was similar to that in Example 42 with these exceptions. The initial reaction temperature was 85° C. The pressure was dropped to 18″ vacuum. The hydrolysis reaction temperature was 35° C. One liter of cyclohexane was used in place of methanol with the acetic acid. The product obtained was 75% hydrolyzed after 2.8 hours. Isolation to particulate polyvinyl alcohol powder was accomplished in a similar manner in a yield of 12.4 lbs. (5.6 kg.).

EXAMPLE 46

The procedure was similar to that in Example 42 with these exceptions. The pressure was lowered to 13″ of vacuum for strip-off. The hydrolysis reaction temperature was 35° C. The amount of methanol used was 1.8 liters instead of 3.6 liters, i.e., 1.8 liters=1440 grams or 45 moles together with 17.9 grams of sodium hydroxide (0.446 mole) used instead of sodium methoxide. One liter of cyclohexane was used with 26 ml. (27.3 grams; 0.45 mole) of glacial acetic acid. A degree of hydrolysis equal to 37% was obtained after four hours in a yield of 12.3 lbs.; (5.6 kg.) of polyvinyl alcohol. Isolation was achieved by stripping off most of the solvent and then drying the remaining product.

EXAMPLE 47

The procedure was similar to that in Example 42 with these exceptions. In place of the 220 grams of vinyl acetate 220 grams of cyclohexane was used for the benzoyl peroxide addition. The pressure was dropped to 16″ of vacuum. The hydrolysis temperature was 35° C. Sodium hydroxide, 9.0 grams (0.22 mole), was used in 900 ml. (720 grams; 22.5 moles) of methanol. For neutralization 13 ml. (13.7 grams; 0.23 mole) of glacial acetic acid and 250 ml. of cyclohexane were used. The degree of hydrolysis was 18% after 4 hours. The polyvinyl alcohol yield was 10.3 lbs. (4.7 kg.). Isolation of the product was accomplished by stripping off most of the diluent (cyclohexane) and then drying the remaining portion of product, polyvinyl alcohol.

EXAMPLE 48

The procedure was similar to that in Example 42 with these exceptions. The pressure was dropped to 11″ vacuum for strip off. The sodium methoxide (44.8 g.) was added in 3330 ml. (2640 grams; 82.3 moles) of methanol. Glacial acetic acid was used for neutralization (47.5 ml.; 50.0 grams; 0.83 mole) in 300 ml. cyclohexane. After 4 hours of reaction time a level of hydrolysis equal to 61% was obtained. Polyvinyl alcohol yield was about 12 lbs. (~5.5 kg.).

EXAMPLE 49

The procedure was similar to that in Example 42 with these exceptions. Pressure was dropped to 15″ of vacuum for strip off. The hydrolysis reaction temperature was 35° C. Sodium methoxide 4.12 grams (0.076 mole) was added in 540 ml. of methanol, i.e. 432 grams or 13.5 moles. Cyclohexane (500 ml.) was used with 6.18 ml. (6.49 grams; 0.11 mole) of glacial acetic acid. After 3 hours a 12% level of hydrolysis was obtained. A polyvinyl alcohol yield of about 13–14 lbs. (~6.1 kg.) was obtained.

EXAMPLE 50

The procedure used was similar to that in Example 42 with these exceptions. The pressure was lowered to 11″ of vacuum. The hydrolysis reaction temperature was 35° C. The amount of sodium hydroxide was 14.3 grams (0.36 mole). The 14.3 grams of sodium hydroxide was added in 1440 ml. of methanol (1150 grams; 35.5 moles). The amount of acetic acid used for neutralization was 20.8 ml. (21.8 grams; 0.36 mole) and 500 ml. of cyclohexane was used. After 4 hours of reaction hydrolysis time a 31% hydrolyzed product polyvinyl alcohol was obtained in a yield of about 12–13 lbs. (~5.7 kg.). Isolation of the polyvinyl alcohol product was achieved by stripping off most of the solvent and then drying the remaining product.

Process data pertinent to Examples 42–50 are present in Table V.

| Example | Equivalents of MeOH [1] | Moles basic catalyst | Reaction time hydrolysis, hrs. | Temp. ° C. (hydrolysis) | Percent (mole) hydrolysis | Yield (lbs.) | Yield (kg.) | $\eta_{inh}$ [2] |
|---|---|---|---|---|---|---|---|---|
| 42 | 0.97 | [3] 0.90 | 5 | 50 | 84 | 13.7 | 6.2 | 0.41 |
| 43 | 0.97 | [3] 0.90 | 3 | 35 | 72 | 11.4 | 5.2 | |
| 44 | 1.95 | [3] 0.90 | 6 | 50 | 98.5 | 9.0 | 4.1 | 9.36 |
| 45 | 0.97 | [3] 0.90 | 2.8 | 35 | 75 | ~12.4 | ~5.6 | 0.32 |
| 46 | 0.49 | [4] 0.45 | 4 | 35 | 37 | 12.3 | 5.6 | 0.36 |
| 47 | 0.25 | [4] 0.22 | 4 | 35 | 18 | 10.3 | 4.7 | 0.34 |
| 48 | 0.89 | [3] 0.38 | 4 | 50 | 61 | ~12 | ~5.5 | 0.36 |
| 49 | 0.15 | [3] 0.076 | 3 | 35 | 12 | ~13–14 | ~6.1 | |
| 50 | 0.38 | [4] 0.36 | 4 | 35 | 31 | ~12–13 | ~5.7 | |

[1] Moles of methanol per moles of vinyl acetate in the polyvinyl acetate to be hydrolyzed.
[2] $\eta_{inh}$=inherent viscosity of 0.2% solution in cyclohexane at 30° C. of the polyvinyl acetate before hydrolysis.
[3] Catalyst: Sodium methoxide.
[4] Catalyst: Sodium hydroxide.

The formation of acetals directly from non-aqueous suspensions of polymerized vinyl ester is demonstrated in Examples 51 and 52.

EXAMPLE 51

A non-aqueous dispersion of polyvinyl acetate was prepared by the method described in Examples 1–5. This dispersion consisted of 318 grams (3.7 moles) of polyvnlyl acetate with 220 grams (2.6 moles) of cyclohexane. To this dispersion was added 56 grams (0.62 moles) of trioxane in 149 ml. of methanol (119 grams; 3.7 moles) containing 5 drops of concentrated hydrochloric acid. Reaction took place at 58° C. for 4.5 hours and was then terminated by the addition of 0.5 gram (0.0092 mole) of sodium methoxide in 10 ml. of methanol resulting in a 31% solids dispersion of polyvinyl formal. Removal of the cyclohexane and other volatiles by evaporation afforded a fine white powder, the infrared spectrum of which showed the presence of formal and acetate groups.

EXAMPLE 52

A non-aqueous dispersion of polyvinyl acetate was prepared by the method described in Examples 1–5. The dispersion consisted of 290 grams (3.4 moles) of polyvinyl acetate with 194 grams (2.3 moles) of cyclohexane.

To this dispersion was added 124 grams (1.72 moles) of n-butyraldehyde in 136 ml. of methanol (109 grams; 3.4 moles) containing 10 drops of concentrated hydrochloric acid. Reaction took place at 64° C. for 12 hours, and then terminated by the addition of 1 gram (0.0185 mole) of sodium methoxide in 10 ml. of methanol resulting in a 50% solids dispersion of polyvinyl butyral. Removal of the cyclohexane and other volatiles by evaporation afforded a fine white powder, the infrared of which showed the presence of acetal and acetate groups.

The feasibility of preparing polymerized vinyl esters with a very low degree of hydrolysis was demonstrated by the following example.

EXAMPLE 53

A non-aqueous dispersion of polyvinyl acetate was prepared by the method described in Examples 1–5. The dispersion consisted of 384 grams (4.5 moles) of polyvinyl acetate with 256 grams (3.05 moles) of cyclohexane. To this dispersion was added over 5–15 minutes a solution of 0.2 gram (0.005 mole) of sodium hydroxide dissolved in 18 ml. (14.4 grams; 0.45 mole) of methanol. The hydrolysis was allowed to continue for 6.5 hours at 32° C. and then terminated with glacial acetic acid. The degree of hydrolysis of the product was 7%.

The following examples demonstrate variations that can be used as regards interfacial agent, alcoholysis catalyst and polymerization initiator.

EXAMPLE 54

The preparation of the non-aqueous dispersion of polyvinyl acetate was similar to that described in Examples 1–5 with the following charge:

| | Grams |
|---|---|
| Vinyl acetate | 240 |
| Cyclohexane | 160 |
| Benzoyl peroxide | 0.300 |
| Ethylene-vinyl acetate copolymer | 0.685 |

The ratio of ethylene-vinyl acetate to vinyl acetate monomer in this run is 1/350 rather than the usual ratio of 1/160. A particle size determination after a reaction time of 18 hours at 70° C. showed that a similar particle size distribution was obtained as with the usual formulation (0.3–1$\mu$).

EXAMPLE 55

The preparation of the non-aqueous dispersion of polyvinyl acetate was achieved with a procedure similar to that described in Examples 1–5 but with several exceptions.

240 grams (2.8 moles) vinyl acetate
160 grams (1.9 moles) cyclohexane
1.2 grams EDBM (polyvinyl ethyl ether)
1.2 grams of 25% solution of diacetylperoxide in dimethyl phthalate The reaction mixture was heated to 65° C. and reaction allowed to proceed for 9 hours. A dispersion of polyvinyl acetate was obtained. The inherent viscosity of the polyvinyl acetate was 0.44 ($\eta_{inh}$=0.44).

EXAMPLE 56

A non-aqueous dispersion of polyvinyl acetate was prepared by the method described in Examples 1–5. The dispersion consisted of 230 grams (2.7 moles) of polyvinyl acetate with 160 grams (1.9 moles) of cyclohexane. Then 2.62 grams concentrated sulfuric acid dissolved in 85.5 grams (2.7 moles) of methanol was added. The reaction was allowed to proceed for 18 hours at 54° C. The infrared showed the presence of hydroxyl and carbonyl bands showing that hydrolysis had taken place. The level of hydrolysis was 82%.

EXAMPLE 57

A dispersion of 240 grams (2.8 moles) of polyvinyl acetate in cyclohexane as a diluent (60% solids) was allowed to react with a solution of 3.58 grams (0.028 mole) of tetraethyl orthotitanate in 163 ml. (129 grams; 2.8 moles) of ethanol for a period of 18 hours at 60° C. The degree of hydrolysis was determined by periodic examination of samples by infrared spectrophotometric analysis and determining the ratio of the hydroxyl band to the carbonyl band.

EXAMPLE 58

A total of 102 grams (1.2 moles) of dispersion polyvinyl acetate stabilized by butadiene-styrene interfacial agent in n-heptane (8.3% solids) was treated with 9.0 ml. (7.3 grams; 0.098 mole) of n-butanol and 3.0 ml. of tetrabutyl orthotitanate in 100 ml. of n-heptane. The reaction mixture was maintained at 95° C. After a period of two hours an additional 9.0 ml. of n-butanol and 3.0 ml. of titanate ester in n-heptane were added. The dispersion was heated at 95° C. for a period of 18 hours. The polyvinyl alcohol remained as a dispersion which could be maintained in such a state or dried to a particulate powder. The infrared spectrum of the dried hydrolyzed resin was comparable to a spectrum of an 18% hydrolyzed polyvinyl acetate.

EXAMPLES 59–67

Non-aqueous dispersions of the polyvinyl alcohol products of Examples 42–50 are cast at room temperature to afford films of said polyvinyl alcohol products.

Although the invention has been described in its preferred forms, the certain degree of particularity, it is understood that the present disclosure has been made only by way of examples, and that numerous changes can be made without departing from the spirit and scope of the invention.

What is claimed is:
1. Method of synthesizing polyvinyl acetals which consists essentially of:
    (a) heating with agitation at a temperature of about 0° to 150° C. for at least 5 minutes a mixture of:
        (1) a vinyl ester, having from 3 to 20 carbon atoms, and inert hydrocarbon diluent, said vinyl ester being present in a concentration of about 5 to 85 percent by weight,
        (2) about 0.1 to 10 percent, based on the weight of said vinyl ester, of a polymeric organic interfacial agent selected from the group consisting of alpha-olefin/vinyl ester copolymers, vinyl acetate graft copolymerized onto ethylene/vinyl acetate copolymers, alkyl polyvinyl ethers, propylene oxide rubbers, or ethylene - propylene terpolymers, and
        (3) about 0.01 to 1 percent, based on the weight of said vinyl ester, of a free radical polymerization initiator;
    (b) recovering normally solid polyvinyl ester as a non-aqueous dispersion having a particle size of about 0.05 to 15 microns and an outer coating of polymeric organic interfacial agent;
    (c) contacting said polyvinyl ester dispersion with a mixture of:
        (1) about 0.05 to 3.0 moles, per mole of polymerized vinyl ester, of an aliphatic alcohol having from 1 to about 6 carbon atoms,
        (2) about 0.03 to 1.5 moles, per mole of polymerized vinyl ester, of an aliphatic aldehyde having from 1 to about 6 carbon atoms, and
        (3) a catalytic amount of an acid catalyst, for at least 5 minutes at a temperature of about 15° C. to 70° C.; and

(d) recovering said polyvinyl acetal.

2. Method claimed in claim 1 wherein the vinyl ester is vinyl acetate, the polymeric organic interfacial agent is an ethylene-vinyl acetate copolymer, the aliphatic alcohol is methanol, the aliphatic aldehyde is n-butyraldehyde and the acid catalyst is hydrochloric acid.

3. Method claimed in claim 1 wherein the vinyl ester is vinyl acetate, the polymeric organic interfacial agent is an ethylene-vinyl acetate copolymer, the alcohol is methanol, the aliphatic aldehyde is formaldehyde and the acid catalyst is hydrochloric acid.

References Cited

UNITED STATES PATENTS 3,166,524 1/1965 Schmidle et al. _____ 260—23
3,281,499 10/1966 Dolce et al. _____ 260—874

MORRIS LIEBMAN, Primary Examiner

J. H. DERRINGTON, Assistant Examiner

U.S. Cl. X.R.

260—33.6, 34.2, 73, 874, 875, 876, 878